(12) United States Patent
Liu et al.

(10) Patent No.: US 11,719,623 B2
(45) Date of Patent: Aug. 8, 2023

(54) SLURRY MATERIAL UNIFORMITY DETECTION DEVICE AND DETECTION METHOD

(71) Applicant: China Agricultural University, Beijing (CN)

(72) Inventors: Zhidan Liu, Beijing (CN); Rui Yang, Beijing (CN); Yufei Zeng, Beijing (CN); Gangfeng Feng, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 0 days.

(21) Appl. No.: 17/630,331

(22) PCT Filed: Jul. 2, 2020

(86) PCT No.: PCT/CN2020/099887
§ 371 (c)(1),
(2) Date: Jan. 26, 2022

(87) PCT Pub. No.: WO2021/017745
PCT Pub. Date: Feb. 4, 2021

(65) Prior Publication Data
US 2022/0252504 A1    Aug. 11, 2022

(30) Foreign Application Priority Data
Jul. 26, 2019    (CN) .......................... 201910681037.8

(51) Int. Cl.
*G01N 21/03*    (2006.01)
*G01N 21/59*    (2006.01)
(Continued)

(52) U.S. Cl.
CPC ......... *G01N 21/0303* (2013.01); *G01N 21/59* (2013.01); *G06T 11/206* (2013.01); *G01N 2021/8405* (2013.01)

(58) Field of Classification Search
CPC .............. G01N 21/0303; G01N 21/59; G01N 2021/8405; G01N 2021/4769; G01N 21/359; G01N 21/01; G06T 11/206
See application file for complete search history.

(56) References Cited

U.S. PATENT DOCUMENTS 4,404,642 A * 9/1983 Rosenthal .............. G01N 21/85
250/339.04
4,487,278 A * 12/1984 Rosenthal ................ G01N 9/02
73/32 R
(Continued)

FOREIGN PATENT DOCUMENTS

| CN | 1140255 A | 1/1997 |
|---|---|---|
| CN | 103119434 A | 5/2013 |

(Continued)

*Primary Examiner* — Roy M Punnoose
(74) *Attorney, Agent, or Firm* — Muncy, Geissler, Olds & Lowe, P.C.

(57) ABSTRACT

The present invention belongs to the technical field of new energy detection, in particular to a material uniformity detection device and method. The purpose of the present invention is to provide a material uniformity detection device which can meet the requirement of detection of diversified materials such as biomass slurry aiming at the problem of difficulty in quantifying uniformity state of the biomass slurry. The sample pool is driven by the rotating lifting device for lifting and spiral motion, data collection is performed on the sample pool in the form of a certain path, and an image is established for the relationship between a large number of light intensity values of transmission light and heights measured for multiple times to respectively display the uniformity of horizontal layering and uniformity in the vertical direction, to judge the overall uniformity of the material samples.

10 Claims, 4 Drawing Sheets

(51) Int. Cl.
  *G06T 11/20*  (2006.01)
  *G01N 21/84*  (2006.01)

(56) References Cited

U.S. PATENT DOCUMENTS

| | | | | |
|---|---|---|---|---|
| 4,609,991 | A * | 9/1986 | Minton | G01N 15/04 |
| | | | | 73/864.82 |
| 4,801,804 | A * | 1/1989 | Rosenthal | G01N 21/474 |
| | | | | 250/252.1 |
| 6,992,759 | B2 * | 1/2006 | Nakayama | G01N 21/0303 |
| | | | | 356/244 |
| 8,481,944 | B2 * | 7/2013 | Rapp | G01J 5/10 |
| | | | | 250/339.07 |
| 2004/0233423 | A1 * | 11/2004 | Nakayama | G01N 21/0303 |
| | | | | 356/440 |

FOREIGN PATENT DOCUMENTS

| | | |
|---|---|---|
| CN | 106383098 A | 2/2017 |
| CN | 107290306 A | 10/2017 |
| CN | 206960297 U | 2/2018 |
| CN | 207074168 U | 3/2018 |
| CN | 107941747 A | 4/2018 |
| CN | 108548781 A | 9/2018 |
| CN | 110411978 A | 11/2019 |
| JP | 2012107952 A | 6/2012 |
| JP | 5121199 B2 | 1/2013 |

* cited by examiner

SLURRY MATERIAL UNIFORMITY DETECTION DEVICE AND DETECTION METHOD

FIELD

The present invention belongs to the technical field of new energy detection, in particular to a material uniformity detection device and method.

BACKGROUND

Biomass has huge reserves and is an efficient resource for energy conservation, environmental protection and waste utilization. In large-scale production, when the biomass slurry is converted and fed into a reactor, the uniformity of biomass slurry has a significant role in improving the utilization ratio. In a narrow sense, the uniformity of biomass slurry refers to the degree of change of the solid content concentration of the biomass slurry with space during the standing or moving process. If the uniformity of biomass slurry is not sufficient, the slurry state will be influenced, and the physical, chemical and fermentation properties will have significant differences. The uniformity of biomass slurry is an important indicator to evaluate the production efficiency, but has been ignored. With the deepening of its utilization degree and the expansion of application fields, uniformity detection brings certain reference values to the production whether uniformity detection is used for biomass energy utilization or for food production and environmental protection.

No domestic studies that propose a clear definition and role for the material uniformity are available now. The existing instruments for turbidity analysis of sludge and water bodies usually consist of a light source part, a light signal receiving part and a detection part.

The Chinese utility model patent with the publication number of CN 206960297U published a fogdrop deposition uniformity detection device, but the device does not quantify the detection results.

The Chinese invention patent with the publication number of CN 108548781A published an image detection method and device for the uniformity of grinding wheel mixed materials, wherein a monochromatic light source is used to irradiate the surface of mixed materials inside a mixer, and a CD camera is used to acquires color images of the surface of the mixed materials, and the uniformity of the mixed materials is judged by the standard deviation or center deviation method through pixel point extraction comparison, however, the device is product of higher technology and difficult to apply to the generally-used measurement of material uniformity.

The Chinese invention patent with the publication number of CN 103119434A published a method for detecting non-uniformity using acoustic waves. The detection device has more interference factors in the detection process and larger measurement errors, and there is no quantitative processing of the detection results.

The Chinese invention patent with the publication number of CN 106383098A published a liquid sample stability detection method and device, a software analysis module is added on the basis of the basic detection module, to analyze the stability characteristics of liquid samples in the form of radar charts, and establish a quantitative state change analysis method of liquid samples over time. However, the existing device and the present invention lack measurement of the spatial state distribution of samples, which is difficult to meet the requirements of state analysis of diversified biomass slurry.

The present invention aims to solve the problem of measuring the spatial state distribution of samples, so as to meet the detection requirements of diversified materials such as biomass slurry.

SUMMARY

The purpose of the present invention is to provide a material uniformity detection device which can meet the requirement of detection of diversified materials such as biomass slurry etc. aiming at the problem of difficulty in quantifying uniformity state of the biomass slurry.

Another purpose of the present invention is to provide a material uniformity detection method.

The purpose of the present invention is achieved by the following technical solution:

a material uniformity detection device is provided, wherein the device comprises a detection unit and an operation control and signal processing unit;

the detection unit comprises a sample detection box shaped like a box; and the sample detection box includes a sample detection box inner shell 7;

the sample detection box inner shell 7 is divided into a light chamber 1 and a dark chamber 2 by a division plate 22, a sample chamber 3 is arranged between the light chamber 1 and the dark chamber 2, and the sample chamber 3 is connected with the sample detection box inner shell 7 by the division plate 22;

the light chamber 1 is provided with a near-infrared light source 4 and a light source fixed bracket 5; wherein the near-infrared light source 4 is fixed to the sample detection box inner shell 7 of the light chamber 1 by means of the light source fixed bracket 5;

the sample detection box inner shell 7 of the dark chamber 2 is provided with an optical sensor 6;

at least two light-transmitting openings are arranged symmetrically on two wall surfaces of the sample chamber 3 parallel to the division plate 22, the light-transmitting opening on the side adjacent to the light chamber 1 is a first light-transmitting opening 9, the light-transmitting opening on the side adjacent to the dark chamber 2 is a second light-transmitting opening 10, and the connecting line between the first light-transmitting opening 9 and the second light-transmitting opening 10 is vertical to the division plate 22;

the near-infrared light source 4 and the optical sensor 6 are arranged on both sides of the sample chamber 3, the near-infrared light source 4, the first light-transmitting opening 9, the second light-transmitting opening 10 and the optical sensor 6 are arranged on the same straight line, to form a detection light path, such that the light signal emitted by the near-infrared light source 4 can be received by the optical sensor 6 after passing through the first light-transmitting opening 9 and the second light-transmitting opening 10 of the sample chamber 3;

the rotating lifting device 12 is fixed to the bottom of the sample detection box, and the sample chamber 3 is fixed above the rotating lifting device 12;

the rotating lifting device 12 comprises a rotating lifting device shell, a guide rail 15, a sliding block 16, a low-speed motor 17, an upper coupler 181, a lower coupler 182, a screw rod 19 and a fixed nut 20, wherein a wall surface of the rotating lifting device shell is provided with at least one guide rail 15 along a vertical direction, the guide rail 15 is provided with a sliding block 16, and the sliding block 16 is provided with a low-speed motor 17;

a top end of the screw rod 19 is arranged inside the sample chamber 3, and is connected with a sample pool support bracket 21 by an upper coupler 181; the sample pool support bracket 21 is fixedly connected with a sample pool 11 above the sample pool support bracket 21; the screw rod 19 passes downwards through the upper end of the rotating lifting device shell, and a fixed nut 20 is sleeved on the screw rod 19, and the fixed nut 20 is fixed on the upper end of the rotating lifting device shell, the bottom end of the screw rod 19 is connected with the power output shaft of the low-speed motor 17 by a lower coupler 182; when the screw rod 19 is at its uppermost position, the bottom of the sample pool 11 is at least not lower than a detection light path formed by the near-infrared light source 4, the first light-transmitting opening 9, the second light-transmitting opening 10 and the optical sensor 6, such that under the driving of the low-speed motor 17, the sample pool 11 can rotate downwards through the detection light path formed by the near-infrared light source 4, the first light-transmitting opening 9, the second light-transmitting opening 10 and the optical sensor 6;

the operation control and signal processing unit comprises a data collection and transmission module 13 and a data processing module 14; and the data collection and transmission module 13 is respectively electrically connected with the optical sensor 6 and the data processing module 14.

The sample pool support bracket 21 may be adjusted according to the size of the sample pool 11.

A material uniformity detection method using the material uniformity detection device is provided, and the method includes the following steps:

1. In the initial state, the screw rod 19 of the rotating lifting device 12 is at its uppermost position, and the bottom of the sample pool 11 is not lower than the detection light path; the material sample is placed in the sample pool 11, and the data collection and transmission module 13 automatically detects whether the sample pool 11 has been placed well and detects whether the liquid level of the material sample reaches a height that meets the detection requirements;

2. After the material sample is placed in the sample pool 11, according to the sample material category, a database is selected in the data processing module 14, and a new data file is created, start material uniformity detection;

3. When the material uniformity detection is initiated, the near-infrared light source 4 is turned on, the rotating lifting device 12 is started, and the screw rod 19 starts to descend; the sample pool 11 is driven by the screw rod 19 of the rotating lifting device 12 to rotate downwards, and data collection starts from the bottom of the sample pool 11, data collection is performed on the sample pool 11 in a certain path, and data collection is finished at the top of the sample height;

the screw rod 19 of the rotating lifting device 12 rotates at a certain rotating speed and descends at a certain speed at the same time, and at certain time intervals, the data collection and transmission module 13 performs data collection and transmission for the light intensity values of transmission light acquired by the optical sensor 6, and processes the data by the data processing module 14 and displays in a predetermined form on a control screen of the instrument control interface, to draw an image for n data of each layer to represent the uniformity degree of a layer of samples in the horizontal direction;

4. When the device detects that the screw rod 19 of the rotating lifting device 12 has descended to a preset height, data collection is finished, the near-infrared light source 4 is turned off, and the screw rod 19 of the rotating lifting device 12 begins to rise, and the sample pool 11 is sent out of the detection area;

5. Steps 1-4 are repeated;

6. An image is established for the relationship between a large number of light intensity values of transmission light and heights measured for multiple times for display, a group of display diagrams are drawn with n data of each layer, for each image, the uniformity data of each layer is represented by an average value, and the data variance is calculated to assist in judging the uniformity of the sample in the vertical direction, to judge the overall uniformity of the material samples;

The database is built on the basis of actual experience and data, and the material samples are given with grade results by calling the uniformity parameters of standard samples of materials commonly used in actual engineering, by comparing the data deviations of the measured value and the standard value, and by performing deviation analysis according to the preset expected value.

In step 1, the volume of the material sample is at least 15 ml.

In step 3, the image is drawn by the data processing module 14, the data processing module 14 acquires a light intensity value of transmission light every 1 second for recording and drawing, and when the screw rod 19 of the rotating lifting device 12 rotates for a circle, the measurement of one layer of material samples is finished, to complete the detection of n data, and the material samples are divided into at least 10 layers according to the above steps.

In step 3, the predetermined form is in the form of an image or data.

In step 3, the time interval is 1 s.

In step 6, the grade results are three grades including "meet the requirements", "basically meet the requirements" and "do not meet the requirements".

In step 6, the user may increase the contents of the database through detection of material samples.

In step 6, the data processing module 14 displays the detection results of uniformity in the form of images, for each image, the uniformity data of each layer is represented by an average value, and the data variance is calculated to assist in judging the uniformity of the sample in the vertical direction, compares the deviation with the database standard sample and gives the grade results.

The present invention has the following beneficial effects:

The material uniformity detection device adopts a rotating lifting device to perform parallel repeated measurement on each layer of samples, which fully takes into account the non-uniformity of horizontal distribution of samples; the method of light intensity analysis detection is adopted to increase the application scope of the present invention, and the uniformity can be effectively detected for liquids, emulsions and turbid liquids. The instrument control interface is used for data collection, and the uniformity effect curve is drawn in real time according to the data measured by the rotating lifting device every one second, the uniformity index is quantified and the uniformity states of individual samples in the horizontal space and the vertical space are given, thereby providing an important reference basis for sample analysis.

REFERENCE NUMERALS

| | |
|---|---|
| 1 light chamber | 2 dark chamber |
| 3 sample chamber | 4 near-infrared light source |
| 5 light source fixed bracket | 6 optical sensor |
| 7 sample detection box inner shell | 8 sample detection box outer shell |
| 9 first light-transmitting opening | 10 second light-transmitting opening |
| 11 sample pool | 12 rotating lifting device |
| 13 data collection and transmission module | |
| 14 data processing module | 15 guide rail |
| 16 sliding block | 17 low-speed motor |
| 181 upper coupler | 19 screw rod |
| 20 fixed nut | 21 sample pool support bracket |
| 22 division plate | 182 lower coupler |

DETAILED DESCRIPTION OF THE EMBODIMENTS

Specific embodiments of the present invention will be further described in details below in combination with accompanying drawings and embodiments.

As shown in FIG. 1 to FIG. 4, a material uniformity detection device includes a detection unit and an operation control and signal processing unit.

The detection unit includes a sample detection box shaped like a box. The sample detection box includes an inner shell and an outer shell composed of a sample detection box outer shell 8 and a sample detection box inner shell 7.

Figure 2:
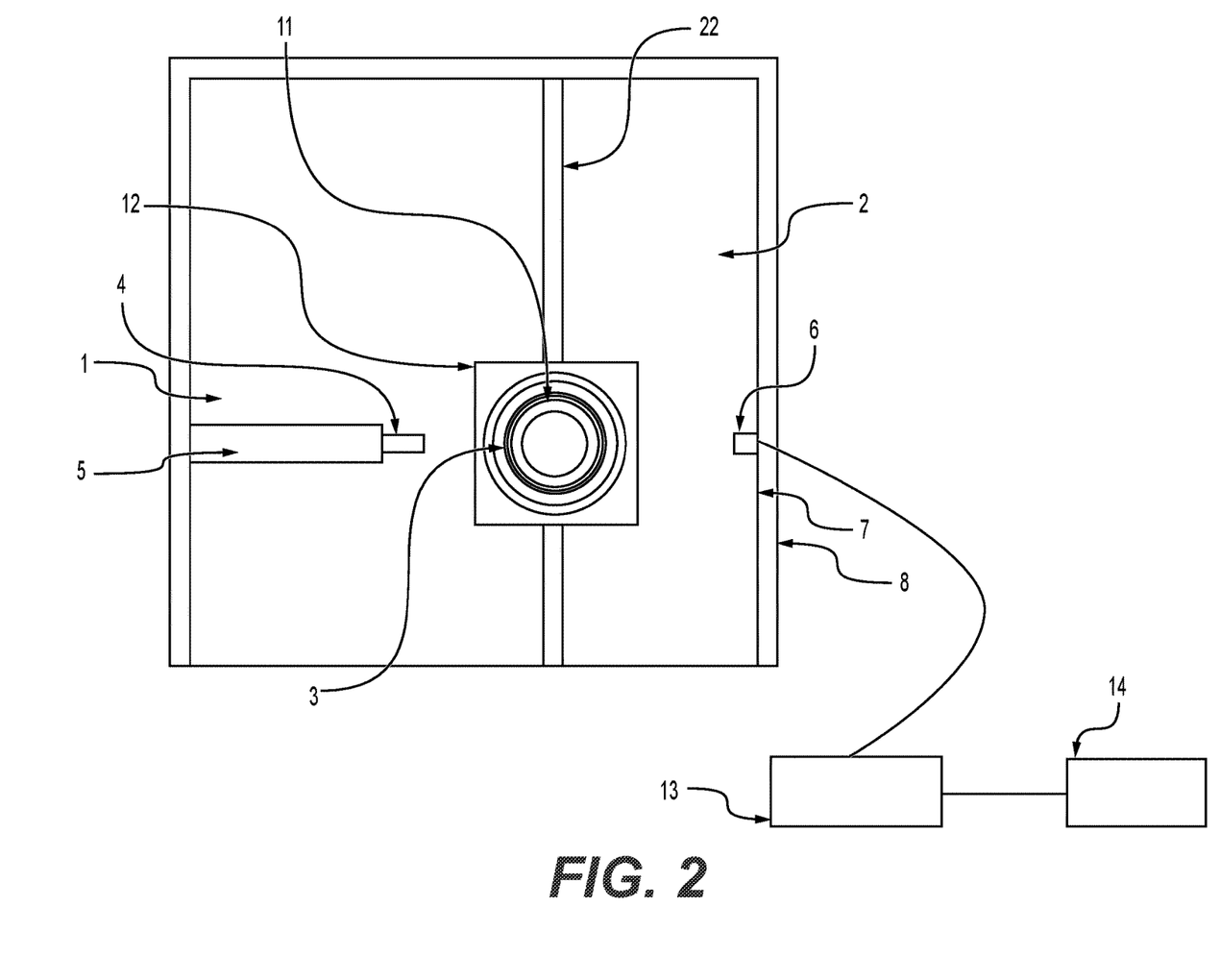
FIG. 2 is a schematic diagram of a top view of a material uniformity detection device (not include the device shell) of the present invention.

As shown in FIG. 2, the sample detection box inner shell 7 is divided into a light chamber 1 and a dark chamber 2 by a division plate 22, a sample chamber 3 is arranged between the light chamber 1 and the dark chamber 2, and the sample chamber 3 is connected with the sample detection box inner shell 7 by the division plate 22.

The light chamber 1 is provided with a near-infrared light source 4 and a light source fixed bracket 5; wherein the near-infrared light source 4 is fixed to the sample detection box inner shell 7 of the light chamber 1 by means of the light source fixed bracket 5.

The sample detection box inner shell 7 of the dark chamber 2 is provided with an optical sensor 6.

Figure 3:
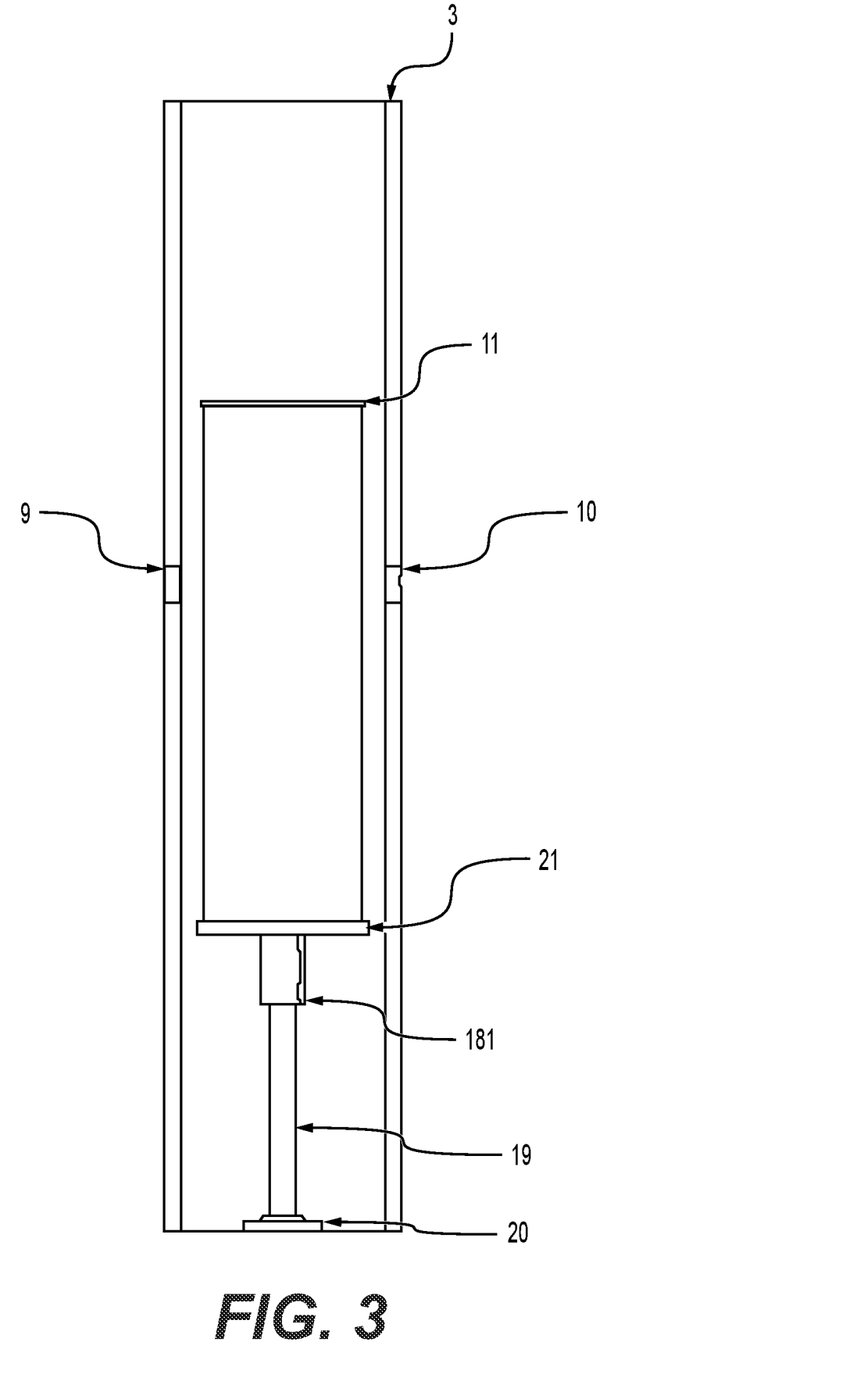
FIG. 3 is a structural schematic diagram of a sample chamber 3 of the present invention.

At least two light-transmitting openings are arranged symmetrically on two wall surfaces of the sample chamber 3 parallel to the division plate 22, the light-transmitting opening on the side adjacent to the light chamber 1 is a first light-transmitting opening 9, the light-transmitting opening on the side adjacent to the dark chamber 2 is a second light-transmitting opening 10, and the connecting line between the first light-transmitting opening 9 and the second light-transmitting opening 10 is vertical to the division plate 22.

The near-infrared light source 4 and the optical sensor 6 are arranged on both sides of the sample chamber 3, the near-infrared light source 4, the first light-transmitting opening 9, the second light-transmitting opening 10 and the optical sensor 6 are arranged on the same straight line, to form a detection light path, such that the light signal emitted by the near-infrared light source 4 can be received by the optical sensor 6 after passing through the first light-transmitting opening 9 and the second light-transmitting opening 10 of the sample chamber 3.

Figure 1:
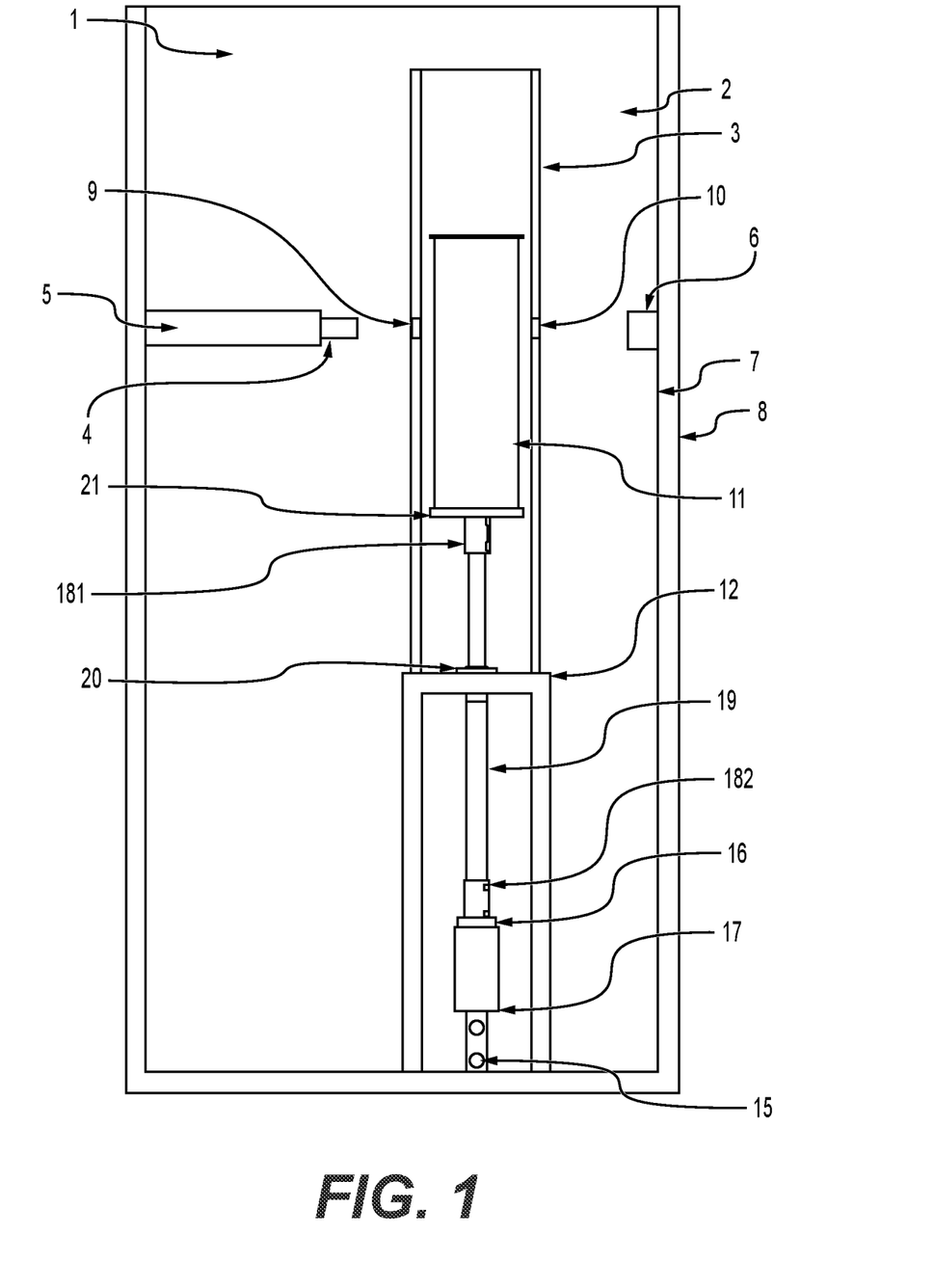
FIG. 1 is a structural schematic diagram of a material uniformity detection device (not include the device shell) of the present invention.

The rotating lifting device 12 is fixed to the bottom of the sample detection box, and the sample chamber 3 is fixed above the rotating lifting device 12.

Figure 4:
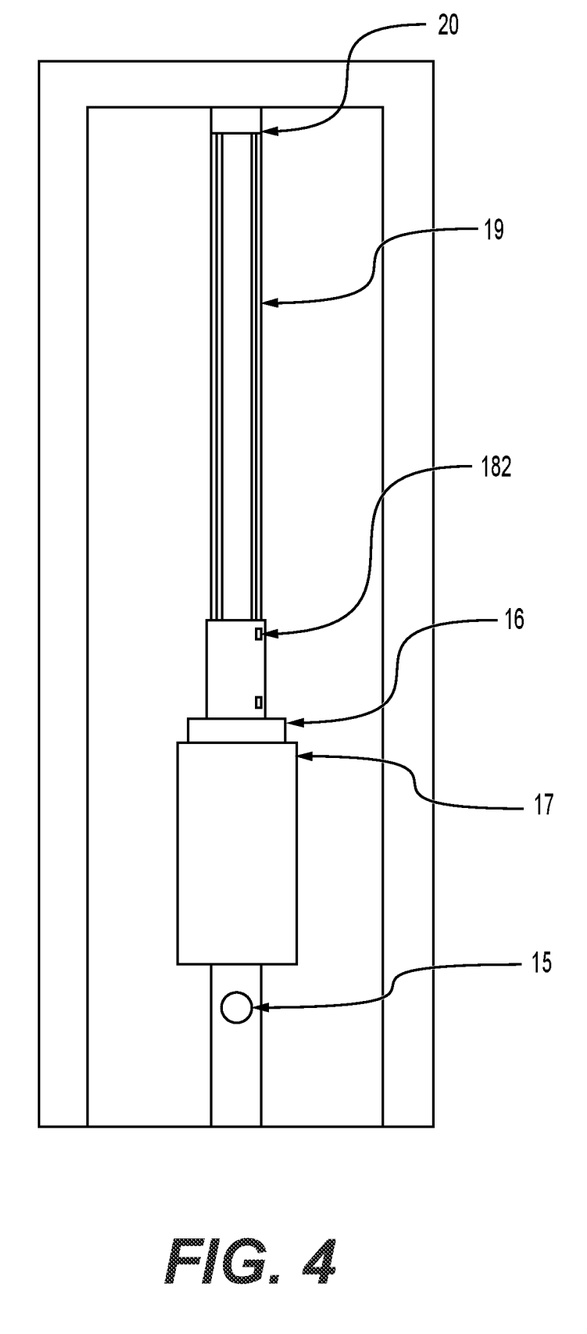
FIG. 4 is a structural schematic diagram of a rotating lifting device 12 of the present invention.

As shown in FIG. 4, the rotating lifting device 12 comprises a rotating lifting device shell, a guide rail 15, a sliding block 16, a low-speed motor 17, an upper coupler 181, a lower coupler 182, a screw rod 19 and a fixed nut 20, wherein a wall surface of the rotating lifting device shell is provided with at least one guide rail 15 along a vertical direction, the guide rail 15 is provided with a sliding block 16, and the sliding block 16 is provided with a low-speed motor 17.

A top end of the screw rod 19 is arranged inside the sample chamber 3, and is connected with a sample pool support bracket 21 by an upper coupler 181; the sample pool support bracket 21 is fixedly connected with a sample pool 11 which is above the sample pool support bracket 21; the sample pool support bracket 21 may be adjusted according to the size of the sample pool 11. The screw rod 19 passes downwards through the upper end of the rotating lifting device shell, and a fixed nut 20 is sleeved on the screw rod 19, and the fixed nut 20 is fixed on the upper end of the rotating lifting device shell, the bottom end of the screw rod 19 is connected with the power output shaft of the low-speed motor 17 by a lower coupler 182; when the screw rod 19 is at its uppermost position, the bottom of the sample pool 11 is at least not lower than a detection light path formed by the near-infrared light source 4, the first light-transmitting opening 9, the second light-transmitting opening 10 and the optical sensor 6, such that under the driving of the low-speed motor 17, the sample pool 11 can rotate downwards through the detection light path formed by the near-infrared light source 4, the first light-transmitting opening 9, the second light-transmitting opening 10 and the optical sensor 6.

As shown in FIG. 2, the operation control and signal processing unit includes a data collection and transmission module 13 and a data processing module 14.

The data collection and transmission module 13 is respectively electrically connected with the optical sensor 6 and the data processing module 14, and data received and acquired by the optical sensor 6 is transmitted to the data processing module 14 by the data collection and transmission module 13. The data collection and transmission module 13 is achieved by an integrated circuit board Arduino.

Wherein the data collection and transmission module 13 is provided with a light signal detection, sampling, transmission device and a computer signal processing system; and the data processing module 14 is provided with a display interface and an analysis interface for signal processing results, to complete the operation control of the detection instrument.

The instrument control interface is arranged in the data processing module 14, including at least data display, data processing, and data analysis functions, and the instrument control interface is achieved by the LabVIEW program development environment developed by National Instruments Corporation.

The present invention provides a material uniformity detection method, including the following steps:

1. In the initial state, the screw rod 19 of the rotating lifting device 12 is at its uppermost position, and the bottom of the sample pool 11 is not lower than the detection light path; the material sample is placed in the sample pool 11, and the data collection and transmission module 13 automatically detects whether the sample pool 11 has been placed well and detects whether the liquid level of the material sample reaches a height that meets the detection requirements. Preferably, the volume of the material sample is at least 15 ml.

2. After the material sample is placed in the sample pool 11, according to the sample material category, a database is selected in the data processing module 14, and a new data file is created, start material uniformity detection.

3. When the material uniformity detection is initiated, the near-infrared light source 4 is turned on, the rotating lifting device 12 is started, and the screw rod 19 starts to descend; the sample pool 11 is driven by the screw rod 19 of the rotating lifting device 12 to rotate downwards, and data collection starts from the bottom of the sample pool 11, data collection is performed on the sample pool 11 in a certain path, and data collection is finished at the top of the sample height.

The screw rod 19 of the rotating lifting device 12 rotates at a certain rotating speed and descends at a certain speed at the same time, and at certain time intervals, the data collection and transmission module 13 performs data collection and transmission for the light intensity values of transmission light acquired by the optical sensor 6, and processes the data by the data processing module 14 and displays in a predetermined form on a control screen of the instrument control interface, to draw an image for n data of each layer to represent the uniformity degree of a layer of samples in the horizontal direction.

Preferably, the time interval is 1 s.

Preferably, the image is drawn by the data processing module 14, the data processing module 14 acquires a light intensity value of transmission light every 1 second for recording and drawing, and when the screw rod 19 of the rotating lifting device 12 rotates for a circle, the measurement of one layer of material samples is finished, to complete the detection of n data, and the material samples are divided into at least 10 layers according to the above steps.

Preferably, the predetermined form is in the form of an image or data.

4. When the device detects that the screw rod 19 of the rotating lifting device 12 has descended to a preset height, data collection is finished, the near-infrared light source 4 is turned off, and the screw rod 19 of the rotating lifting device 12 begins to rise, and the sample pool 11 is sent out of the detection area.

5. Steps 1 to 4 are repeated.

6. An image is established for the relationship between a large number of light intensity values of transmission light and heights measured for multiple times for display, a group of display diagrams are drawn with n data of each layer, for each image, the uniformity data of each layer is represented by an average value, and the data variance is calculated to assist in judging the uniformity of the sample in the vertical direction, to judge the overall uniformity of the material samples.

The database is built on the basis of actual experience and data, and the material samples are given with grade results by calling the uniformity parameters of standard samples of materials commonly used in actual engineering, by comparing the data deviations of the measured value and the standard value, and by performing deviation analysis according to the preset expected value. Preferably, the grade results are three grades including "meet the requirements", "basically meet the requirements" and "do not meet the requirements".

Preferably, the user may increase the contents of the database by detection of material samples, thereby facilitating comparison and calling.

Preferably, the data processing module 14 displays the detection results of uniformity in the form of images, for each image, the uniformity data of each layer is represented by an average value, and the data variance is calculated to assist in judging the uniformity of the sample in the vertical direction, compares the deviation with the database standard sample and gives the grade results.

In the material uniformity detection method of the present invention, the light intensity value is the light intensity value of the transmission light received by the optical sensor after the light source penetrates through the material sample.

The invention claimed is:

1. A biomass slurry material uniformity detection device, wherein the device comprises a detection unit and an operation control and signal processing unit;
   the material sample is placed in the sample pool, the material sample is liquid;
   the detection unit comprises a sample detection box shaped like a box; and the sample detection box comprises a sample detection box inner shell;
   the sample detection box inner shell is divided into a light chamber and a dark chamber by a division plate a sample chamber is arranged between the light chamber and the dark chamber, and the sample chamber is connected with the sample detection box inner shell by the division plate;
   the light chamber is provided with a near-infrared light source and a light source fixed bracket; wherein the near-infrared light source is fixed to the sample detection box inner shell of the light chamber by the light source fixed bracket;
   the sample detection box inner shell of the dark chamber is provided with an optical sensor;
   at least two light-transmitting openings are arranged symmetrically on two wall surfaces of the sample chamber parallel to the division plate, the light-transmitting opening on the side adjacent to the light chamber is a first light-transmitting opening, the light-transmitting opening on the side adjacent to the dark chamber is a second light-transmitting opening, and the connecting line between the first light-transmitting opening and the second light-transmitting opening is perpendicular to the division plate;
   the near-infrared light source and the optical sensor are arranged on opposite sides of the sample chamber, the near-infrared light source, the first light-transmitting opening, the second light-transmitting opening and the optical sensor are arranged along a common axis, to form a detection light path, such that the light signal emitted by the near-infrared light source can be received by the optical sensor after passing through the first light-transmitting opening and the second light-transmitting opening of the sample chamber;
   a rotating lifting device is fixed to the bottom of the sample detection box, and the sample chamber is fixed above the rotating lifting device;
   the rotating lifting device comprises a rotating lifting device shell, a guide rail, a sliding block, a low-speed motor, an upper coupler, a lower coupler, a screw rod and a fixed nut, wherein
   a wall surface of the rotating lifting device shell is provided with at least one guide rail along a vertical direction, the guide rail is provided with a sliding block, and the sliding block is provided with a low-speed motor;

a top end of the screw rod is arranged inside the sample chamber, and is connected with a sample pool support bracket by an upper coupler; the sample pool support bracket is fixedly connected with a sample pool which is above the sample pool support bracket; the screw rod passes downwards through the upper end of the rotating lifting device shell, and a fixed nut is sleeved on the screw rod, and the fixed nut is fixed on the upper end of the rotating lifting device shell, the bottom end of the screw rod is connected with the power output shaft of the low-speed motor by a lower coupler; when the screw rod is at its uppermost position, the bottom of the sample pool is at least not lower than a detection light path formed by the near-infrared light source, the first light-transmitting opening, the second light-transmitting opening and the optical sensor, such that under the driving of the low-speed motor, the sample pool can rotate downwards through the detection light path formed by the near-infrared light source, the first light-transmitting opening, the second light-transmitting opening and the optical sensor;

the operation control and signal processing unit comprises a data collection and transmission module and a data processing module; and the data collection and transmission module is respectively electrically connected with the optical sensor and the data processing module, and data received and acquired by the optical sensor is transmitted to the data processing module by the data collection and transmission module.

2. The biomass slurry material uniformity detection device according to claim 1, wherein the sample pool support bracket may be adjusted according to the size of the sample pool.

3. A biomass slurry material uniformity detection method using the material uniformity detection device according to claim 1, wherein the method comprises the following steps:
1) in the initial state, the screw rod of the rotating lifting device is at its uppermost position, and the bottom of the sample pool is not lower than the detection light path; the material sample is placed in the sample pool, and the data collection and transmission module automatically detects whether the sample pool has been placed to detect whether the liquid level of the material sample reaches a height that meets the detection requirements;
2) after the material sample is placed in the sample pool, according to the sample material category, a database is selected in the data processing module, and a new data file is created, start material uniformity detection;
3) when the material uniformity detection is initiated, the near-infrared light source is turned on, the rotating lifting device is started, and the screw rod starts to descend; the sample pool is driven by the screw rod of the rotating lifting device to rotate downwards, and the data collection starts from the bottom of the sample pool, data collection is performed on the sample pool in a certain path, and data collection is finished at the top of the sample height;
the screw rod of the rotating lifting device rotates at a certain rotating speed and descends at a certain speed at the same time, and at certain time intervals, the data collection and transmission module performs data collection and transmission for the light intensity values of transmission light acquired by the optical sensor, and processes the data by the data processing module and displays in a predetermined form on a control screen of the instrument control interface, to draw an image for n data of each layer to represent the uniformity degree of a layer of samples in the horizontal direction;
4) when the device detects that the screw rod of the rotating lifting device has descended to a preset height, data collection is finished, the near-infrared light source is turned off, and the screw rod of the rotating lifting device begins to rise, and the sample pool is sent out of the detection area;
5) steps 1) to 4) are repeated;
6) an image is established for the relationship between a large number of light intensity values of transmission light and heights measured for multiple times for display, a group of display diagrams are drawn with n data of each layer, for each image, the uniformity data of each layer is represented by an average value, and the data variance is calculated to assist in judging the uniformity of the sample in the vertical direction, to judge the overall uniformity of the material samples;
the database is built on the basis of actual experience and data, and the material samples are given with grade results by calling the uniformity parameters of standard samples of materials commonly used in actual engineering, by comparing the data deviations of the measured value and the standard value, and by performing deviation analysis according to the preset expected value.

4. The biomass slurry material uniformity detection method according to claim 3, wherein in step 1), the volume of the material sample is at least 15 ml.

5. The biomass slurry material uniformity detection method according to claim 3, wherein in step 3), the image is drawn by the data processing module, the data processing module acquires a light intensity value of transmission light every second for recording and drawing, and when the screw rod of the rotating lifting device rotates for a circle, the measurement of one layer of material samples is finished, to complete the detection of n data, and the material samples are divided into at least 10 layers according to the above steps.

6. The biomass slurry material uniformity detection method according to claim 3, wherein in step 3, the predetermined form is in the form of an image or data.

7. The biomass slurry material uniformity detection method according to claim 3, wherein in step 3), the time interval is 1 s.

8. The biomass slurry material uniformity detection method according to claim 3, wherein in step 6), the grade results are three grades including "meet the requirements", "basically meet the requirements" and "do not meet the requirements".

9. The biomass slurry material uniformity detection method according to claim 3, wherein in step 6), the user may increase the contents of the database by detection of material samples.

10. The biomass slurry material uniformity detection method according to claim 3, wherein in step 6), the data processing module displays the detection results of uniformity in the form of images, for each image, the uniformity data of each layer is represented by an average value, and the data variance is calculated to assist in judging the uniformity of the sample in the vertical direction, compares the deviation with the database standard sample and gives the grade results.

* * * * *